C. T. SMALL.
FEEDING DEVICE.
APPLICATION FILED NOV. 6, 1916.
1,297,505.
Patented Mar. 18, 1919.
2 SHEETS—SHEET 2.
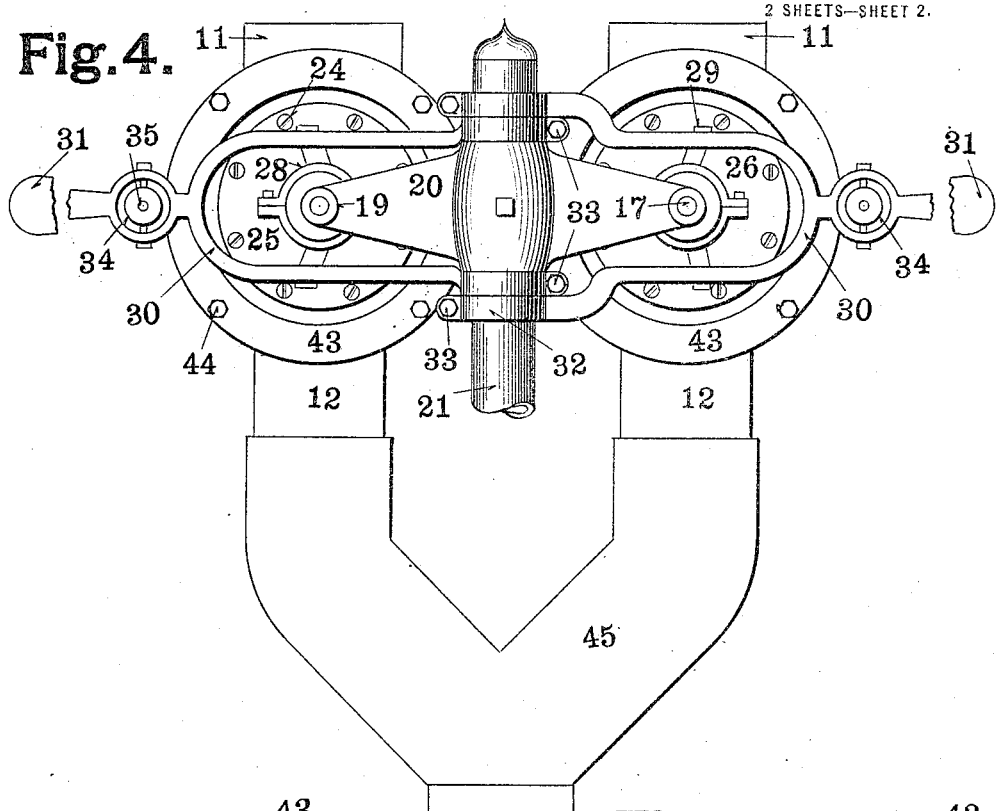
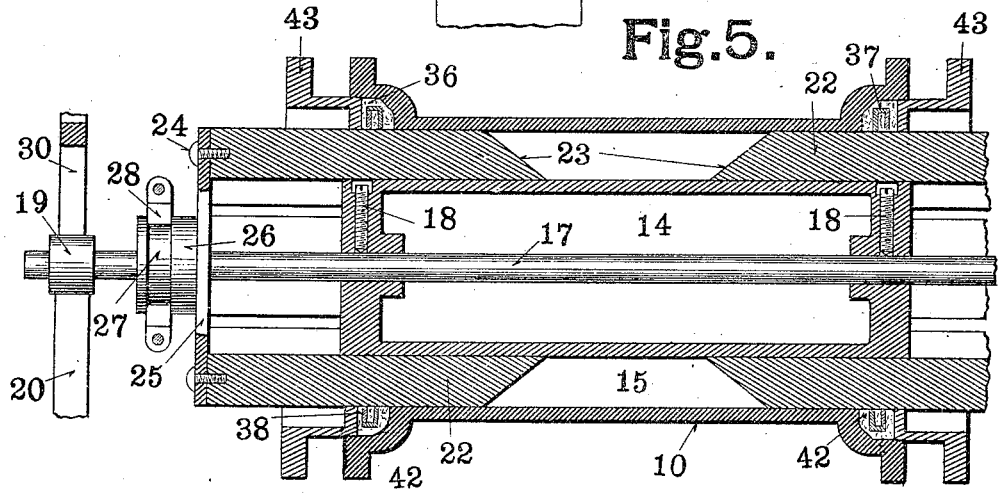
WITNESS
W. A. Alexander
INVENTOR
C. T. Small
BY
E. E. Huffman
ATTORNEY

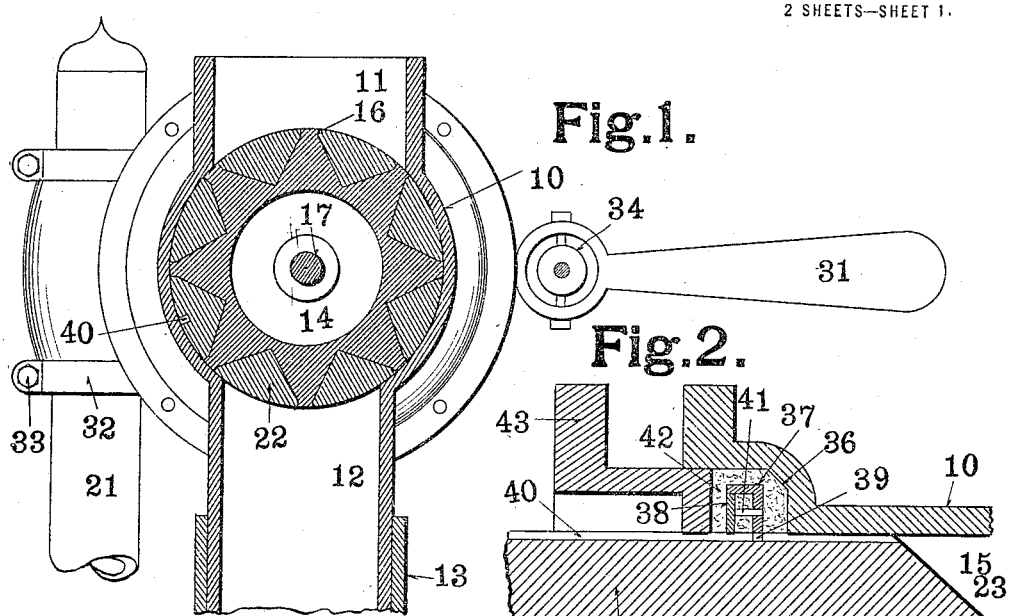
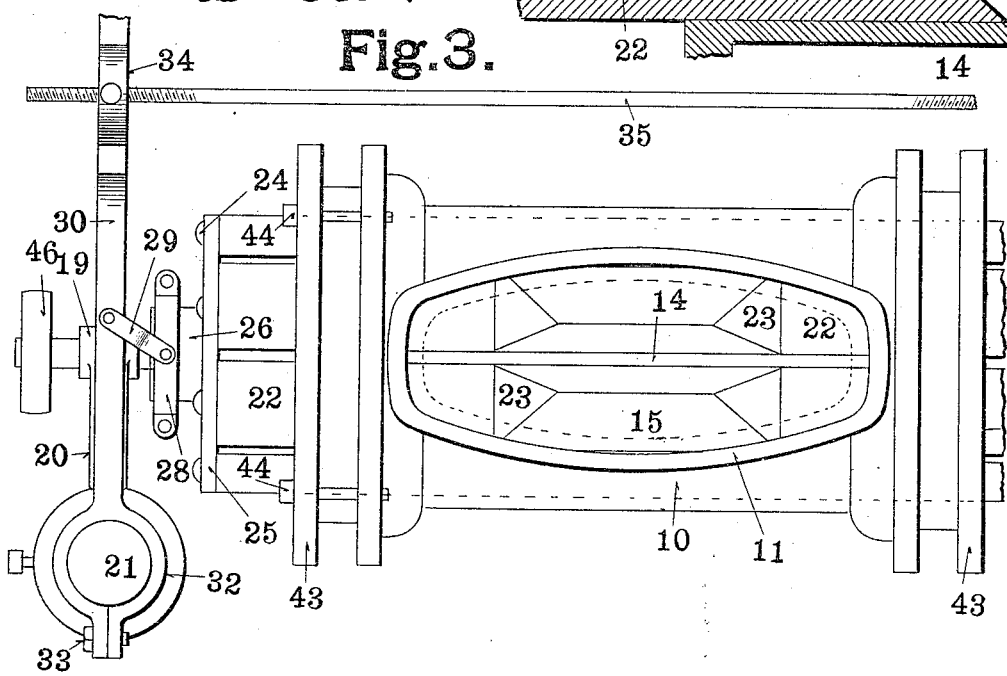

UNITED STATES PATENT OFFICE.

CHESLEY T. SMALL, OF ST. LOUIS, MISSOURI.

FEEDING DEVICE.

1,297,505.   Specification of Letters Patent.   Patented Mar. 18, 1919.

Application filed November 6, 1916. Serial No. 129,699.

*To all whom it may concern:*

Be it known that I, CHESLEY T. SMALL, a citizen of the United States of America, residing at the city of St. Louis, State of Missouri, United States of America, have invented a certain new and useful Feeding Device, of which the following is such a full, clear, and exact description as will enable any one skilled in the art to which it appertains to make and use the same, reference being had to the accompanying drawings, forming part of this specification.

My invention relates to a feeding device, and is more particularly adapted for use in feeding powdered or granular material to can filling machines. It may be, however, used for any purpose where a steady and accurate feed of granular or powdered material is required.

In the accompanying drawings, which illustrate one form of feeding device made in accordance with my invention, Figure 1 is a vertical section; Fig. 2 is an enlarged sectional view showing a detail of construction; Fig. 3 is a top plan view, with one end broken away; Fig. 4 is an end view showing two of my feeding devices operated together; and Fig. 5 is a horizontal section.

Like marks of reference refer to similar parts in the several views of the drawings.

10 is a cylindrical casing having an inlet tube 11, which is attached to any suitable source of supply, and a discharge tube 12 leading to the filling machine or other device for using the material. In Fig. 1 of the drawings the tube 12 is shown as telescoping with a second tube 13. Within the cylindrical casing 10 is a drum shaped member 14, provided with a number of V-shaped grooves 15, each of which extends across the periphery of the said member 14. In order to prevent any tendency of the fingers, which will hereinafter be described, to slide out of the grooves 15, each of said grooves is provided at its inner edge with a shoulder 16, as shown in Fig. 1, the part beyond said shoulder forming a substantially radial wall against which a corresponding radial face of the finger bears. The drum 14 is secured to a central shaft 17 by means of a set screw 18, as shown in Fig. 5. The shaft 17 is supported in bearings 19 carried by brackets 20, which are secured to suitable uprights 21, which may be a part of the filling machine in connection with which the feeding device is used. In each of the grooves 15 are a pair of fingers 22 of corresponding cross section with the said grooves. Each of the fingers 22 has its inner end 23 beveled, as best shown in Fig. 5 of the drawings, and the fingers at each end of the device are secured by means of screws 24 to a disk 25, provided with a hub 26. The triangular form of the fingers together with the beveled form of their ends provided effective means for scraping adhering materials from the walls of the pockets. Formed in the hub 26 is an annular groove 27 adapted to receive a two-part ring 28. This two-part ring 28 is connected by means of a pair of links 29, with a yoke 30 provided with a handle 31. The yoke is provided with a pair of split rings 32, so that the said yoke may be moved pivotally around the upright 21 to adjust the fingers, as will hereinafter be described. Bolts 33 in the split rings 32 serve to tighten the said rings on the upright 21 when the fingers are properly adjusted.

In order to secure a fine adjustment of the fingers I provide each of the yokes 30 adjacent to the handle 31 with a gimbal 34 adapted to receive a rod 35, provided with right and left-hand threads. By rotating this rod 35, it will be evident that the yokes 30 at opposite ends of the cylinder can be drawn toward or forced away from each other, so as to cause the inclined ends 23 of the fingers 22 to advance toward or recede from each other, and thus vary the size of the pockets formed in the periphery of the drum by the slots 15.

The casing 10 is provided at each end with a recess 36 in which is placed a metallic packing ring formed of two annular parts 37 and 38, respectively. The part 37 is provided with an inwardly extending lug 39, which engages with a groove or keyway 40, formed in one of the fingers 22, so as to cause the packing ring to rotate with the drum and fingers. The other annular member 38 is secured to the annular member 37 by means of a pin 41. Placed between the two parts of the packing ring is fibrous material 42, which also surrounds the said ring, and is forced into position by means of a cap or gland 43, secured to the end of the drum by means of bolts 44. The drum 14 is rotated by means of a pulley 46 shown in Fig. 3 of the drawings.

In Fig. 4 of the drawings I have shown two of my feeding devices arranged side by side and secured to the upright 21. In this construction the single tube 13, shown in Fig. 1, is replaced by a double or Y-shaped tube 45, so as to unite the material fed by the two drums. It will be evident that a number of my devices may be used in a similar manner when it is desired to feed the machine with more than two kinds of material.

The operation of my machine will be evident. The material is fed from any suitable source through the supply pipe 11 to the casing 10. While the drum 14 is rotated at a regular rate of speed the material will fall into the pockets formed between the ends of the fingers 22, and thus a definite amount will be carried down to the discharge pipe 12 at each rotation of the drum. If it is desired to change the amount fed at each rotation of the drum the fingers 22 are advanced toward or caused to recede from each other by means of the right and left hand threaded rod 35. After the proper adjustment has been secured the bolts 33 are tightened and firmly hold the yokes 30 in place. It will be evident that this will secure an accurate adjustment of the amount fed at each rotation of the drum. The inclined ends 23 of the fingers 22, together with the inclined sides of the grooves 15 form a pocket of such shape that the material to be fed will not adhere to it, which would cause irregularity in the feed. The form of packing, shown in detail in Fig. 2, is such as to effectively prevent the passage of fine material, such as baking powder, at the ends of the machine while it is in operation. By using two or more devices, as shown in Fig. 4, mixtures of different ingredients can be fed to the machine in accurate proportions.

Having fully described my invention, what I claim as new and desire to secure by Letters Patent of the United States is:

1. In a feeding device, the combination with a rotary member provided with pockets for material to be fed, a pair of fingers arranged in each of said pockets, and means for adjusting said fingers toward and away from each other to vary the size of the pockets.

2. In a feeding device, the combination with a casing of a rotary member in said casing and provided with pockets for the material to be fed, fingers for varying the size of said pockets, and controlling means operated simultaneously and uniformly at both ends of the rotary member, whereby the pockets retain their central position relative to the casing in their various adjustments.

3. In a feeding device, the combination with a rotary member provided with pockets for the material to be fed, of fingers sliding in said pockets to vary the size thereof, each of said fingers being provided with a beveled end meeting with the periphery in a plane substantially perpendicular to the axis of the rotary member.

4. In a feeding device, the combination with a cylindrical rotary member provided with pockets for the material to be fed, said pockets extending across the periphery of said member and being substantially triangular in cross-section, a pair of fingers in each of said pockets, and means for adjusting said fingers toward and away from each other to vary the size of said pockets.

5. In a feeding device, the combination with a cylindrical rotary member provided with pockets for the material to be fed, said pockets extending across the periphery of said member and being substantially triangular in cross section, a pair of fingers in each of said pockets, the opposing ends of said fingers being beveled, and means for adjusting said fingers toward and away from each other to vary the size of the pockets.

6. In a feeding device, the combination with a cylindrical member provided with an inlet and an outlet passage, of a rotary cylindrical member in said casing, said member being provided with a plurality of grooves extending across its periphery and forming pockets, a pair of fingers in each set of said grooves, the fingers at each end of said member being attached together, and means for simultaneously moving said two sets of fingers to vary the size of the pockets.

7. In a feeding device, the combination with a cylindrical casing provided with an inlet and an outlet passage, of a rotary member in said casing provided with a plurality of transverse grooves, a pair of feed controlling members each carrying a plurality of fingers projecting into said grooves, a pair of yokes operatively connected to said feed controlling members, and means for simultaneously actuating said yokes.

In testimony whereof, I have hereunto set my hand and affixed my seal.

CHESLEY T. SMALL. [L. S.]